(12) United States Patent
Ren et al.

(10) Patent No.: US 9,502,707 B2
(45) Date of Patent: Nov. 22, 2016

(54) THREE TERMINAL BATTERY

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Wen-Sheng Ren, Shenzhen (CN); Jun Zhang, Shenzhen (CN); Tsung-Jen Chuang, New Taipei (TW)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 22 days.

(21) Appl. No.: 14/062,833

(22) Filed: Oct. 24, 2013

(65) Prior Publication Data

US 2015/0004468 A1 Jan. 1, 2015

(30) Foreign Application Priority Data

Jun. 28, 2013 (CN) .......................... 2013 1 0268893

(51) Int. Cl.
| | |
|---|---|
| H01M 2/30 | (2006.01) |
| H01M 4/525 | (2010.01) |
| H01M 4/587 | (2010.01) |
| H01M 4/66 | (2006.01) |
| H01M 10/058 | (2010.01) |
| H01M 10/052 | (2010.01) |

(52) U.S. Cl.
CPC .............. *H01M 2/30* (2013.01); *H01M 4/525* (2013.01); *H01M 4/587* (2013.01); *H01M 4/661* (2013.01); *H01M 10/058* (2013.01); *H01M 10/052* (2013.01); *Y02E 60/122* (2013.01)

(58) Field of Classification Search
None
See application file for complete search history.

(56) References Cited

U.S. PATENT DOCUMENTS

| | | | | |
|---|---|---|---|---|
| 5,164,273 A | * | 11/1992 | Szasz et al. | 429/123 |
| 6,451,481 B1 | * | 9/2002 | Lee et al. | 429/218.1 |
| 2006/0057433 A1 | * | 3/2006 | Ando et al. | 429/9 |

FOREIGN PATENT DOCUMENTS

JP 10083806 A * 3/1998

* cited by examiner

*Primary Examiner* — Gregg Cantelmo
(74) *Attorney, Agent, or Firm* — Zhigang Ma

(57) ABSTRACT

A three terminal battery includes a first positive electrode, a first negative electrode, a second positive electrode, a second negative electrode connected to the first negative electrode, a first terminal, a second terminal, and a third terminal. The first positive electrode is connected to the first terminal. The second positive electrode is connected to the second terminal. The first negative electrode and the second negative electrode are connected to the third terminal.

2 Claims, 3 Drawing Sheets

THREE TERMINAL BATTERY

BACKGROUND

1. Technical Field

The present disclosure relates to batteries, and particularly to a three terminal battery with a first positive voltage output, a second positive voltage output, and a negative voltage output.

2. Description of Related Art

A group of batteries are connected in series in order to obtain a first positive voltage output, a second positive voltage output, and a negative voltage output, however, if this could be accomplished using only one battery, it would be more convenient and save on resources.

Therefore, it is desirable to provide a three terminal battery with a first positive voltage output, a second positive voltage output, and a negative voltage output.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

Embodiments of the present disclosure will be described with reference to the drawings.

Figure 1:
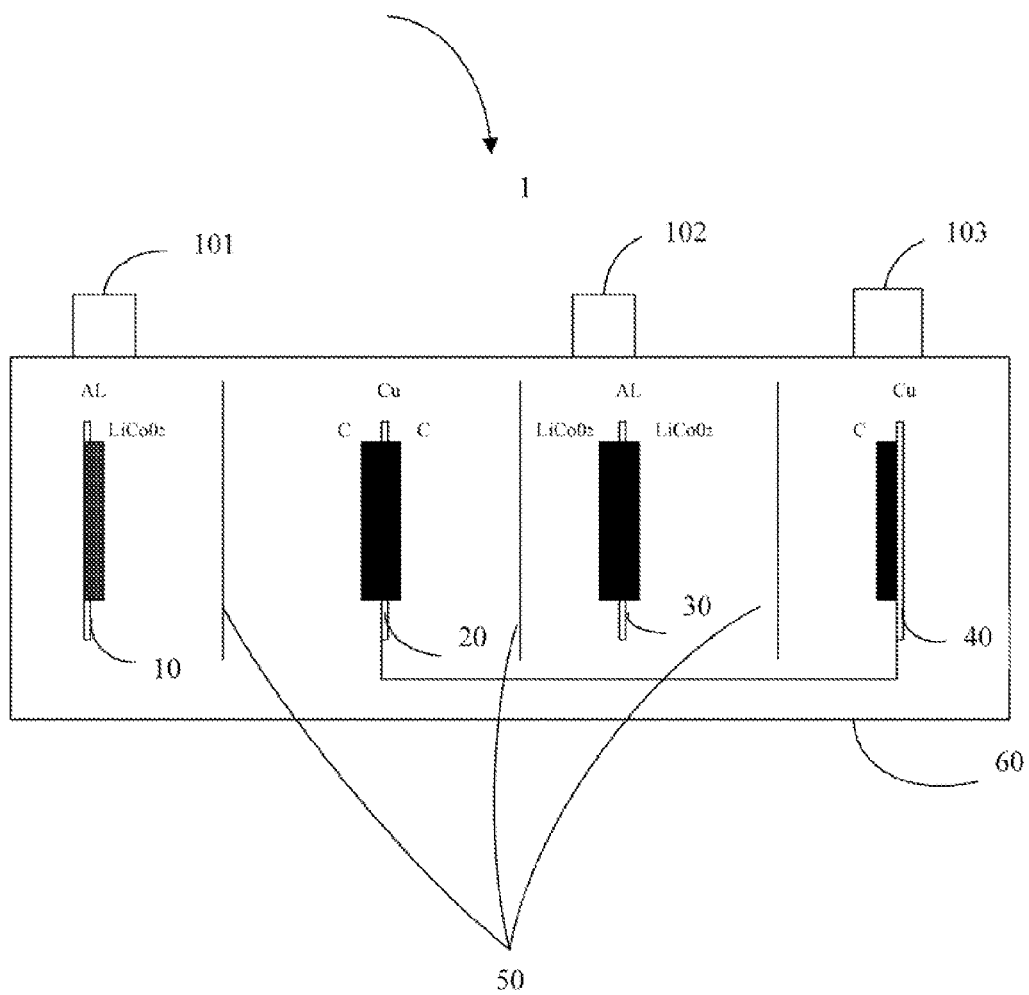
FIG. 1 is a schematic view of an embodiment of a three terminal battery.

FIG. 1 is a schematic view of an embodiment of a three terminal battery 1. The three terminal battery 1 includes a first positive electrode 10, a first negative electrode 20, a second positive electrode 30, and a second negative electrode 40, several isolating membranes 50, and a shell 60. The battery 1 has electrolyte inside that allows ions to move from positive electrode to negative electrode during discharge and recharge. The first positive electrode 10, the first negative electrode 20, the second positive electrode 30, the second negative electrode 40, the several isolating membranes 50, and the shell 60 can all be made using conventional materials which are known in the art.

The first negative electrode 20 is connected to the second negative electrode 40, the first positive electrode 10 is connected to a first terminal 101, a second positive electrode 30 is connected to a second terminal 102, and the first negative electrode 20 and the second negative electrode 40 are connected to a third terminal 103.

In an embodiment, the first positive electrode 10 and the second positive electrode 30 are made of aluminum(AL), the first negative electrode 20 and the second negative electrode 40 are made of copper(CU). One side of the first positive electrode 10 near to the first negative electrode 20 is layered with LiCoO2. Both sides of the first negative electrode 20 are layered with carbon (C). Both sides of the second positive electrode 30 are layered with LiCoO2. One side of the second negative electrode 40 near to the second positive electrode 30 is layered with carbon (C).

Figure 2:
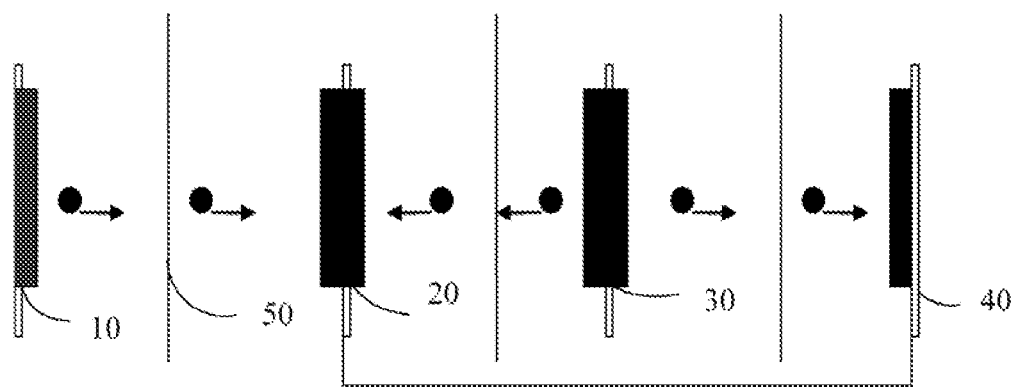
FIG. 2 is a schematic view of movement of electrochemical ions when the three terminal battery of FIG. 1 is charging.

FIG. 2 is a schematic view of movement of electrochemical ions when the three terminal battery 1 is charging.

To charge the battery 1, the first positive electrode 10 and the second positive electrode 30 are connected to a positive terminal of a power source, the first negative electrode 20 and the second negative electrode 40 are connected to a negative terminal of the power source. The first positive electrode 10 and the second positive electrode 30 generates Li+ ions, which are driven by the positive terminal and the negative terminal of the power source to the C layered sides. As shown in FIG. 2, the ions Li+ from the first positive electrode 10 move to one side of the first negative electrode 20, the ions Li+ from one side of the second positive electrode 30 move to the other side of the first negative electrode 20, and the ions Li+ from the other side of the second positive electrode 30 move to the C layered side of the second negative electrode 40.

Figure 3:
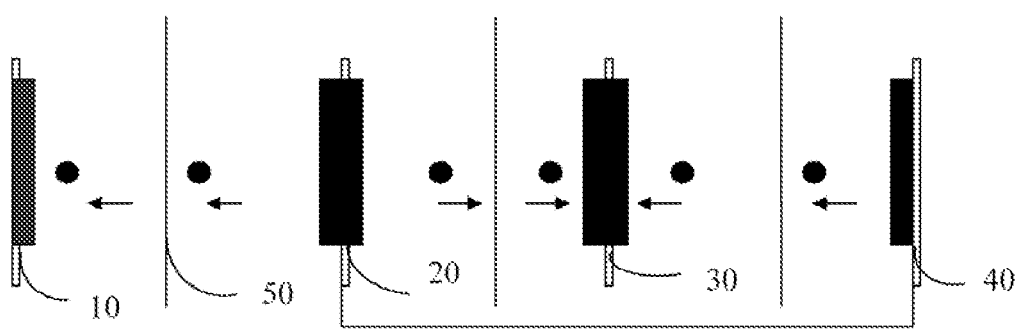
FIG. 3 is a schematic view of movement of electrochemical ions when the three terminal battery of FIG. 1 is discharging.

FIG. 3 is a schematic view of movement of electrochemical ions when the battery 1 discharges. Compared with FIG. 2, when discharging, the ions Li+ move reverse order from the C layered sides back to the positive electrode 10, 30. As shown in FIG. 3, the Li+ ions from one side of the first negative electrode 20 move to the first positive electrode 10, the Li+ ions from the other side of the first negative electrode 20 move to one side of the second positive electrode 30, and the Li+ ions from the second negative electrode 40 move to the other side of the second positive electrode 30.

As both sides of the second positive electrode 30 are layered with LiCoO2, and only one side of the first positive electrode 10 is layered with LiCoO2, and both sides of the first negative electrode 20 are layered with carbon (C), and only one side of the second negative electrode 40 is layered with C, output voltage of the first positive electrode 10 is lower than output voltage of the second positive electrode 30, that is, a voltage output of the first terminal 101 is lower than a voltage output of the second terminal 102.

Therefore, using the third terminal 103 as the negative terminal, a first voltage output is obtained from the first terminal 101, a second voltage output is obtained from the second terminal 102; using the first terminal 101 as a negative terminal, a negative voltage is obtained from the third terminal 103, and a positive voltage is obtained from the second terminal 102.

It will be understood that the above particular embodiments are shown and described by way of illustration only. The principles and the features of the present disclosure may be employed in various and numerous embodiments thereof without departing from the scope of the disclosure. The above-described embodiments illustrate the possible scope of the disclosure but do not restrict the scope of the disclosure.

What is claimed is:

1. A three terminal battery comprising:
   a first positive electrode made of aluminium;
   a first negative electrode made of copper;
   a second positive electrode made of aluminium;
   a second negative electrode made of copper, the second negative electrode being connected with the first negative electrode;
   a first terminal;
   a second terminal; and
   a third terminal;
   wherein one side of the first positive electrode near to the first negative electrode is layered with LiCoO2, both sides of the first negative electrode are layered with carbon, both sides of the second positive electrode are layered with LiCoO2, and one side of the second negative electrode near to the second positive electrode is layered with carbon;

wherein the first positive electrode is connected to the first terminal, the second positive electrode is connected to the second terminal, and the first negative electrode and the second negative electrode are connected to the third terminal;

wherein when the third terminal is used as a negative terminal, a first voltage output is obtained from the first terminal, a second voltage output is obtained from the second terminal; and when the first terminal is used as a positive terminal, a negative voltage is obtained from the third terminal, and a positive voltage is obtained from the second terminal.

2. The three terminal battery of claim 1, wherein a voltage output of the first positive electrode is lower than a voltage output of the second positive electrode.

* * * * *